United States Patent [19]

Marzola et al.

[11] 4,278,586

[45] Jul. 14, 1981

[54] GLASS FIBER-REINFORCED POLYOLEFINS

[75] Inventors: Roberto Marzola, Ferrara; Enea Garagnani, Piumazzo, both of Italy

[73] Assignee: Montedison S.p.A., Milan, Italy

[21] Appl. No.: 71,481

[22] Filed: Aug. 31, 1979

[30] Foreign Application Priority Data

Sep. 1, 1978 [IT] Italy .............................. 27243 A/78
Jul. 26, 1979 [IT] Italy .............................. 24668 A/79

[51] Int. Cl.³ ............................................. C08K 7/14
[52] U.S. Cl. ............................... 260/42.18; 260/42.46
[58] Field of Search ........................... 260/42.18, 42.46

[56] References Cited

U.S. PATENT DOCUMENTS

| | | | |
|---|---|---|---|
| 3,928,687 | 12/1975 | Wada et al. ........................ | 260/42.18 |
| 4,003,874 | 1/1977 | Ide et al. ............................ | 260/42.18 |
| 4,056,505 | 11/1977 | Taylor et al. ...................... | 260/42.18 |

FOREIGN PATENT DOCUMENTS 1321508  6/1973  United Kingdom .

*Primary Examiner*—Lewis T. Jacobs

[57] ABSTRACT

Blends consisting of:
 (a) 50–90% by weight of a crystalline polyolefin, such as polyethylene or polypropylene, and
 (b) 50–10% by weight of glass fibers, characterized in that said blends contain from 0.5 to 5% by weight, with respect to the polyolefin, of a bis-maleamic acid coupling agent such as N,N'-hexamethylene- or N,N'-dodecamethylene-bis-maleamic acid. Glass fiber-reinforced polyolefins are also disclosed.

12 Claims, No Drawings

GLASS FIBER-REINFORCED POLYOLEFINS

THE PRIOR ART

It is known that, due to their apolar character, polyolefins are not adapted to being effectively reinforced with inorganic fibers.

In order to overcome such drawback, it has been suggested to modify the olefinic polymer by grafting monomers having polar groups onto the hydrocarbon chain.

There are known examples of modifications of the olefin polymer to be reinforced with inorganic fibers, by means of techniques which foresee generally a preliminary chemical treatment of the polymer with polar monomers and with agents capable of forming active centers on the polymeric chain, such as, for instance, peroxides or ionizing radiations.

It is also possible to achieve the graft reaction directly in the transforming equipment, by feeding it with a mixture of olefin polymer, glass fibers, polar monomer and peroxide, and by then bringing the mass to the forming temperature. In this case, however, besides the formation of generally toxic volatile products, there occurs the drawback that the peroxide hardly decomposes in a total way and that, therefore, it residues exert a negative influence especially on the long-term properties of the composite material.

Moreover, a treatment of polyethylene or polypropylene in the molten state with peroxides causes changes in the melt index of the polymer that are difficult to control and reproduce.

THE PRESENT INVENTION

One object of this invention is to provide polyolefins reinforced with glass fibers and having improved mechanical characteristics.

Another object is to provide blends of polyolefins with glass fibers and containing an additive or coupling agent capable of promoting the adhesion of the glass fibers to the polyolefin during processing thereof.

These and other objects are achieved by this invention in accordance with which it is possible to obtain composite materials with excellent mechanical characteristics starting from mixtures of crystalline olefins (in particular polyethylene, polypropylene, polybutene and poly-4-methylpentene-1), glass fibers and a bis-maleamic acid of the general formula:

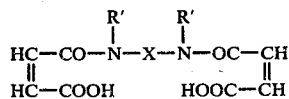

wherein X is a $(CHR)_n$ group, in which n is an integer from 2 to 18, and R is hydrogen or an alkyl with 1–6 carbon atoms, or X is a cycloaliphatic or aromatic bivalent group which may have several muclei, or a heterocyclic group; R' is hydrogen, the two R's together being capable of forming another $(CHR)_n$ group when X is $(CHR)_n$.

Representative and presently preferred bis-maleamic acids for use in practicing the invention are:
N,N'-hexamethylene-bis-maleamic acid;
N,N'-ethylene-bis-maleamic acid;
N,N'-trimethylene-bis-maleamic acid;
N,N'-dodecamethylene-bis-maleamic acid;
N,N'-piperazine-bis-maleamic acid;
N,N'-m-phenylene-bis-maleamic acid;
N,N'-3,3'-(trans-stilbene-5,5'-sodiumsulphonate)bis-maleamic acid;
N,N'-4,4'-(diphenyl-ether)-bis-maleamic acid;
N,N'-4,4'-(diphenylmethane)-bis-maleamic acid;
N,N'-isophorone-bis-maleamic acid (*); and
N,N'-2,5-dimethylene-norbornene-bis-maleamic acid.

(*) See Table 2 (footnote) infra.

The preparation of the composite materials is carried out by heating the blend of polyolefin, glass fibers and bis-maleamic acid without it being necessary to use peroxides or other substances capable of supplying free radicals.

The bis-maleamic acid is used in quantities that may vary from 0.5 to 5% by weight with respect to the polyolefin.

The term crystalline polyolefins includes also the crystalline copolymers of the alpha-olefins with each other or with ethylene. More particularly, in said term are comprised products containing up to about 20% by weight of polymerized ethylene, obtained by polymerization of propylene in the presence of ethylene added at the beginning or during the polymerization of the propylene.

As already mentioned, the method of preparing the composite materials of this invention consists in preparing a mixture of the polymer, glass fibers and bis-maleamic acid and in then heating the "dry blend" thus obtained at a temperature that in general is comprised between 200° C. and the decomposition temperature of the polymer, and that coincides practically with the forming temperature of the polymer.

In the case of polypropylene, the forming temperature is comprised between 200° C. and 290° C.

In practice, the preparation of the composite material of this invention, or of the corresponding manufactured article, is carried out by subjecting the mixtures containing the polymer, the glass fibers, and the bis-maleamic acid, or a granulate obtained from such mixtures by granulation according to known methods, to forming according to known technologies.

The glass fibers, in general, constitute from 10% to 50% weight of the polyolefin glass fibers blend. As glass fibers there are used fibers that have preliminarily been subjected to a finishing treatment with a silane and with a film former having, in the molten state, a surface tension near that of the polyolefinic matrix.

Examples of such useful silanes include: α-aminopropyl-triethoxy-silane, aminoethyl-triethoxy-silane, α-aminobutyl-triethoxy-silane and α-glycidoxy-propyl-trimethoxy-silane.

As the above mentioned film formers of polyolefinic nature there may be used, for instance, polypropylene, polyethylene, ethylene-propylene rubbers and ethylene-propylenediene rubbers.

Such olefinic rubbers passes a molecular weight comprised between 50,000 and 800,000, preferably between 70,000 and 500,000, and contain from 20% to 80% in mols of ethylene and, when unsaturated, from 0.1 to 20% in mols of a conjugated or unconjugated diene hydrocarbon such as butadiene, isoprene, 1,3-pentadiene, 1,4-pentadiene, 1,4-hexadiene, 1,5-hexadiene, 1,9-decadiene, alkenyl-norbornenes such as 5-methylene-2-norbornene and 5-vinyl-2-norbornene, norbornadienes such as 2-alkyl-2,5-norbornadienes, alkylidene-norbornenes such as 5-ethylidene-2-nobornene, cyclopentadienes and others.

The glass fibers are treated with the silane and the film former according to known coating techniques.

As previously indicated, the blends of this invention allow to achieve an excellent polymer-to-fiber adhesion and, thus, the attainment of a breaking load considerably greater than that attainable without the use of the bis-maleamic acid, and this, without the need of modifying, protectively, the polymer or the use of peroxides. In this way, besides avoiding a costly process for protective modification of the polymer, one also avoids all drawbacks connected with the use of sources of free radicals, such as for instance, cross-linking, degrading and poor resistance of the product to ageing.

As crystalline-alpha-olefins such as polypropylene, polybutene, poly-4-methylpentane-1 there are preferably used such polymers having prevailingly isotactic structure. More particularly there is used polypropylene having an isotacticity index greater than 90%.

In the following examples, given for purely illustrative and not limiting purposes, the glass fibers used have a coating based on α-aminopropyl-triethoxy-silane and on a terpolymer consisting of 67% of ethylene, 30% of propylene and 3% of 5-ethylidene-2-norbornene, said percentages being expressed by weight.

EXAMPLES 1-4

1400 g of polypropylene in the form of powder, having an isotacticity index of 95, density=0.90 g/cc and a melt-index L=10 g/10. (ASTM-1238 standards) were mixed for 5 minutes with the quantities of N,N'-hexamethylene-bis-maleamic acid indicated in Table I and with an anti-oxidant formulation, in a powder mixer, under a nitrogen atmosphere.

The anti-oxidant formulation comprised 0.2% of dilauryl-thiodipropionate, 0.1% of tetra[3-(3,5-di-t-butyl-4-hydroxyphenyl)propionate] of pentaerythritol, 0.2% Ca stearate, and 0.1% of 2,6-di-t-butyl-p-cresol, the percentages by weight being referred to the polypropylene.

For comparative purposes, in the first of the 4 tests no use was made of bis-maleamic acid.

The 4 "dry blends" were extruded under a nitrogen atmosphere in a Pasquetti double-screw extruder, at 205° C., thereby obtaining a modified and stabilized granular polypropylene. To this granular product there were added 30% (on the total) of glass fibers of the "chopped strands" type, 6 mm long, and then the whole mass was extruded in the Pasquetti double-screw extruder at 205° C., thereby obtaining a reinforced polypropylene.

The test pieces for the physical-mechanical characterization were prepared on a V 160/72 tape injection molding press built by GBF of Bresso (Italy), and which operated under the following conditions:
temperature of extruder body and head—250° C.
temperature of die—25° C.
injection time for test pieces for tensile test—20 sec.
complete cycle for the test pieces for tensile test—70 sec.
injection time for the best pieces for bending tests, impact tests and HDT—80 sec.
complete cycle for the test pieces for bending tests, impact tests and HDT—100 sec.

For the test pieces molded in the 4 tests, Table I reports the values for the tensile breaking load (ASTM D-638 standards), for the elastic modulus under bending (ASTM D-790 standard), for the Izod resilience with notch at −20° C. (ASTM D-256), for the HDT (heat distortion temperature) (ASTM D-648) and for the creep in bending test carried out on the central part of the test piece for tensile test (distance between supports=4 cm) at 80° C. and at 120° C. for 8 hours under a load of 100 kg/sq.cm.

TABLE I

| Example No. | 1 | 2 | 3 | 4 |
|---|---|---|---|---|
| Polypropylene, g | 1,400 | 1,400 | 1,400 | 1,400 |
| Glass fibers, g | 600 | 600 | 600 | 600 |
| N,N'-hexamethylene-bis-maleamic acid, g | — | 7 | 14 | 28 |
| Tensile breaking load kg/sq.cm | 403 | 935 | 1,065 | 924 |
| Flexural elastic modulus kg/sq.cm | 54,750 | 58,100 | 57,200 | 55,200 |
| Izod resilience with notch at −20° C., kg/cm/cm | 8.62 | 16.3 | 10.9 | 9.16 |
| HDT °C. | 133.3 | 148. | 148. | 144.5 |
| Deformation in mm resulting from creep tests under bending at 80° C. | 1. | 0.42 | 0.39 | 0.47 |
| at 120° C. | — | 0.55 | 0.57 | — |

EXAMPLES 5-8

1,400 g of a polypropylene powder having an isotacticity index equal to 95, density=0.90 g/cc and a melt index L=10 g/10 min. (ASTM D-1238 standards) were mixed for 5 minutes in a powder mixer, under a nitrogen atmosphere, with 600 g of glass fibers of the "chopped strands" type of 6 mm length and with the quantities of bis-maleamic acids reported in Table II, together with the same anti-oxidant formation used in Examples 1–4.

The four "dry blends" thus obtained were injection molded and characterized as in Examples 1–4, the results being recorded in Table II.

TABLE II

| Example No. | 5 | 6 | 7 | 8 |
|---|---|---|---|---|
| Polypropylene g | 1,400 | 1,400 | 1,400 | 1,400 |
| Glass fibers g | 600 | 600 | 600 | 600 |
| N,N'-hexamethylene-bis-maleamic acid g | 7 | 14 | — | — |
| N,N'-dodecamethylene-bis-maleamic acid | — | — | 7 | — |
| N,N'-isophorone-bis-maleamic acid (*) | — | — | — | 7 |
| Tensile breaking load Kg/sq.cm | 943 | 939 | 940 | 970 |
| Flexural elastic modulus Kg/sq.cm | 56,370 | 58,900 | 63,000 | 57,250 |
| Izod resilience with notch at −20° C. Kg/cm/cm | 19.8 | 17.2 | 13. | 13. |
| HDT °C. | 152. | 150.5 | 149. | 149. |
| Deformation in mm resulting from creep tests under bending at 80° C. | — | — | 0.39 | 0.41 |
| at 120° C. | — | — | 0.62 | 0.62 |

(*)Trivial name of the bis-maleamic acid derived from 1-aminomethyl-5-amino-1,3,3-trimethylcyclohexane and having the formula

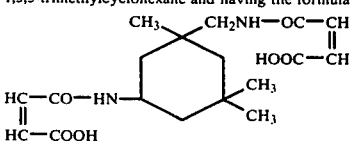

EXAMPLE 9

1,400 g of high density polyethylene powder, having a density of 0.962 g/cc and a melt index E=5.5 g/10 minutes (ASTM D-1238 standards) were mixed for 5 minutes in a powder mixer and in a nitrogen atmosphere, together with 600 g of glass fibers of the "chopped strands" type of 6 mm length, with 7 g of N,N'-hexamethylene-bis-maleamic acid and with an anti-oxidant formulation comprising 0.03% of n-octadecyl 3-(4-hydroxy-3,5-di-t-butylphenyl)propionate, 0.02% of 2,6-di-t-butyl-p-cresol, 0.04% of glyceryl monostearate and 0.1% of Ca stearate, the percentages being referred to polyethylene.

The "dry blend" thus obtained was injection molded and characterized as in Examples 1 to 4.

The tensile breaking load (ASTM D-638 standards) was 950 kg/sq.cm, while the flexural elastic modulus (ASTM D-790) was 63,650 kg/sq.cm.

The Izod resiliency with notch −20°C. (ASTM D-256) was 30 kg/cm.cm (partially broken test piece), while the HDT (according to ASTM D-648) was 123° C.

We claim:

1. Blends consisting of:
   (a) 50–90% by weight of a crystalline polyolefin, and
   (b) 50–10% by weight of glass fibers, characterized in that said blends contain from 0.5 to 5% by weight, with respect to the polyolefin, of a bis-maleamic acid of the general formula:

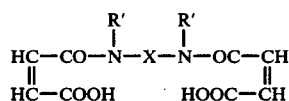

wherein X is a $(CHR)_n$ group, in which n is an integer from 2 to 18, and R is hydrogen or an alkyl with 1–6 carbon atoms, or X is a cycloaliphatic or aromatic bivalent group including such groups having several nuclei, or a heterocyclic group; R' is hydrogen, the two R's together being capable of forming a $(CHR)_n$ group which X is $(CHR)_n$.

2. Blends according to claim 1 and containing as bis-maleamic acid, N,N'-hexamethylene-bis-maleamic acid.

3. Blends according to claim 1 and containing as bis-maleamic acid, N,N'-dodecamethylene-bis-maleamic acid.

4. Blends according to claim 1 and containing, as bis-maleamic acid, N,N'-isophorone-bis-maleamic acid.

5. Blends according to claim 1, in which the crystalline polyolefin is polypropylene.

6. Blends according to claim 1, in which the crystalline polyolefin is polyethylene.

7. Glass fiber-reinforced polyolefins in the form of a granular product obtained by granulation of the blends according to claim 1.

8. Manufactured articles reinforced with glass fibers, obtained by molding the blends according to claim 1, or the granular product according to claim 7.

9. Glass fiber-reinforced polypropylene in the form of a granular product obtained by granulation of a blend according to claim 5.

10. A manufactured article reinforced with glass fibers, obtained by molding a blend according to claim 5, or a granular product according to claim 9.

11. A glass fiber-reinforced polyethylene in the form of a granular product obtained by granulation of a blend according to claim 6.

12. A manufactured article reinforced with glass fibers, obtained by molding a blend according to claim 6, or a granular product according to claim 11.